United States Patent
Tseng (10) Patent No.: US 7,830,458 B2
(45) Date of Patent: Nov. 9, 2010

(54) METHOD AND SYSTEM FOR SCANNING VIDEO CARRIER CHANNELS OF A TELEVISION

(75) Inventor: Shih-Hua Tseng, Taipei (TW)

(73) Assignee: Tatung Company, Taipei (TW)

( * ) Notice: Subject to any disclaimer, the term of this patent is extended or adjusted under 35 U.S.C. 154(b) by 1052 days.

(21) Appl. No.: 11/584,509

(22) Filed: Oct. 23, 2006

(65) Prior Publication Data

US 2008/0030626 A1 Feb. 7, 2008

(30) Foreign Application Priority Data

Aug. 7, 2006 (TW) .............................. 95128817 A (51) Int. Cl.
H04N 5/50 (2006.01)

(52) U.S. Cl. ........................ 348/731; 348/732; 348/735

(58) Field of Classification Search ......... 348/731–733, 348/725, 735; 725/38; *H04N 5/50, 5/44*
See application file for complete search history.

(56) References Cited

U.S. PATENT DOCUMENTS 6,437,837 B1 * 8/2002 Seo ............................ 348/735
7,151,577 B2 * 12/2006 Yamamoto et al. .......... 348/731
2005/0054345 A1 3/2005 Lee ............................ 455/434

FOREIGN PATENT DOCUMENTS

GB 2 232 026 A 11/1990

* cited by examiner

*Primary Examiner*—Sherrie Hsia
(74) *Attorney, Agent, or Firm*—Bacon & Thomas, PLLC (57) ABSTRACT

In a television having a memory storing a plurality of central frequencies of channels, a method for scanning a single video carrier channel includes: (A) entering a channel; (B) providing a frequency correction, which is set to zero in initialization; (C) reading a central frequency of the channel from the memory as a target frequency of the channel; (D) determining if a TV channel exists at the target frequency; recording the target frequency as a frequency of the channel when the TV channel exists, and otherwise executing step (E); (E) adding a predetermined frequency difference to the frequency correction to thereby obtain an updated frequency correction; (F) setting the target frequency to a value of the central frequency plus or minus the updated frequency correction when the updated frequency correction is not greater than a predetermined frequency bound, and executing step (D).

23 Claims, 12 Drawing Sheets

| CATV Frequency | | | | |
|---|---|---|---|---|
| Channel Number | | Video Carrier Channel (Mhz) | | Conventional Channel Number |
| G I | E I A | S T D | H R C | I R C |
| 54 | 1 | N/A | 72.0036 | 73.2625 | 4+ , A-8 |
| 2 | 2 | 55.25 | 54.0027 | 55.2625 | |
| 3 | 3 | 61.25 | 60.003 | 61.2625 | |
| 4 | 4 | 67.25 | 66.0033 | 67.2625 | |
| 5 | 5 | 77.25 | N/A | N/A | |
| 6 | 6 | 83.25 | N/A | N/A | |
| 55 | 5 | N/A | 78.0039 | 79.2625 | A-7 |
| 56 | 6 | N/A | 84.0042 | 85.2625 | A-6 |
| 7 | 7 | 175.25 | 174.0087 | 175.2625 | |
| 8 | 8 | 181.25 | 180.009 | 181.2625 | |
| 9 | 9 | 187.25 | 186.0093 | 187.2625 | |
| 10 | 10 | 193.25 | 192.0096 | 193.2625 | |
| 11 | 11 | 199.25 | 198.0099 | 199.2625 | |
| 12 | 12 | 205.25 | 204.0102 | 205.2625 | |
| 13 | 13 | 211.25 | 210.0105 | 211.2625 | |

FIG. 1A (Prior Art)

| 14 | 14 | 121.2625 | 120.006 | 121.2625 | A |
| 15 | 15 | 127.2625 | 126.0063 | 127.2625 | B |
| 16 | 16 | 133.2625 | 132.0066 | 133.2625 | C |
| 17 | 17 | 139.25 | 138.0069 | 139.2625 | D |
| 18 | 18 | 145.25 | 144.0072 | 145.2625 | E |
| 19 | 19 | 151.25 | 150.0075 | 151.2625 | F |
| 20 | 20 | 157.25 | 156.0078 | 157.2625 | G |
| 21 | 21 | 163.25 | 162.0081 | 163.2625 | H |
| 22 | 22 | 169.25 | 168.0084 | 169.2625 | I |
| 23 | 23 | 217.25 | 216.0108 | 217.2625 | J |
| 24 | 24 | 223.25 | 222.0111 | 223.2625 | K |
| 25 | 25 | 229.2625 | 228.0114 | 229.2625 | L |
| 26 | 26 | 235.2625 | 234.0117 | 235.2625 | M |
| 27 | 27 | 241.2625 | 240.012 | 241.2625 | N |
| 28 | 28 | 247.2625 | 246.0123 | 247.2625 | O |
| 29 | 29 | 253.2625 | 252.0126 | 253.2624 | P |
| 30 | 30 | 259.2625 | 258.0129 | 259.2625 | Q |
| 31 | 31 | 265.2625 | 264.0135 | 265.2625 | R |

FIG. 1B (Prior Art)

| | | | | | |
|---|---|---|---|---|---|
| 32 | 32 | 271.2625 | 270.0135 | 271.2625 | S |
| 33 | 33 | 277.2625 | 276.0138 | 277.2625 | T |
| 34 | 34 | 283.2625 | 282.0141 | 283.2625 | U |
| 35 | 35 | 289.2625 | 288.0144 | 289.2625 | V |
| 36 | 36 | 295.2625 | 294.0147 | 295.2625 | W |
| 37 | 37 | 301.2625 | 300.015 | 301.2625 | X |
| 38 | 38 | 307.2625 | 306.0153 | 307.2625 | Y |
| 39 | 39 | 313.2625 | 312.0156 | 313.2625 | Z |
| 40 | 40 | 319.2625 | 318.0159 | 319.2625 | DD |
| 41 | 41 | 325.2625 | 324.0162 | 325.2625 | EE |
| 42 | 42 | 331.2750* | 330.0165 | 331.275 | FF |
| 43 | 43 | 337.2625 | 336.0168 | 337.2625 | GG |
| 44 | 44 | 343.2625 | 342.0171 | 343.2625 | HH |
| 45 | 45 | 349.2625 | 348.0174 | 349.2625 | II |
| 46 | 46 | 355.2625 | 354.0177 | 355.2625 | JJ |
| 47 | 47 | 361.2625 | 360.018 | 361.2625 | KK |
| 48 | 48 | 367.2625 | 366.0183 | 367.2625 | LL |
| 49 | 49 | 373.2625 | 372.0186 | 373.2625 | MM |

FIG. 1C (Prior Art)

| | | | | | |
|---|---|---|---|---|---|
| 50 | 50 | 379.2625 | 378.0189 | 379.2625 | NN |
| 51 | 51 | 385.2625 | 384.0192 | 385.2625 | OO |
| 52 | 52 | 391.2625 | 390.0195 | 391.2625 | PP |
| 53 | 53 | 397.2625 | 396.0198 | 397.2625 | QQ |
| 62 | 54 | 403.25 | 402.0201 | 403.2625 | RR |
| 63 | 55 | 409.25 | 408.0204 | 409.2625 | SS |
| 64 | 56 | 415.25 | 414.0207 | 415.2625 | TT |
| 65 | 57 | 421.25 | 420.021 | 421.2625 | UU |
| 66 | 58 | 427.25 | 426.0213 | 427.2625 | VV |
| 67 | 59 | 433.25 | 432.0216 | 433.2625 | WW |
| 68 | 60 | 439.25 | 438.0219 | 439.2625 | XX |
| 69 | 61 | 445.25 | 444.0222 | 445.2625 | YY |
| 70 | 62 | 451.25 | 150.0225 | 451.2625 | ZZ |
| 71 | 63 | 457.25 | 456.0228 | 457.2625 | |
| 72 | 64 | 463.25 | 462.0231 | 463.2625 | |
| 73 | 65 | 469.25 | 468.0234 | 469.2625 | |
| 74 | 66 | 475.25 | 474.0237 | 475.2625 | |
| 75 | 67 | 481.25 | 480.024 | 481.2625 | |

FIG. 1D (Prior Art)

| 75 | 67 | 481.25 | 480.024 | 481.2625 | |
|---|---|---|---|---|---|
| 76 | 68 | 487.25 | 486.0243 | 487.2625 | |
| 77 | 69 | 493.25 | 192.0246 | 493.2625 | |
| 78 | 70 | 499.25 | 498.0249 | 499.2625 | |
| 79 | 71 | 505.25 | 504.0252 | 505.2625 | |
| 80 | 72 | 511.25 | 510.0255 | 511.2625 | |
| 81 | 73 | 517.25 | 516.0258 | 517.2625 | |
| 82 | 74 | 523.25 | 522.0261 | 523.2625 | |
| 83 | 75 | 529.25 | 528.0264 | 529.2625 | |
| 84 | 6 | 535.25 | 534.0267 | 535.2625 | |
| 85 | 77 | 541.25 | 540.027 | 541.2625 | |
| 86 | 78 | 547.25 | 546.0273 | 547.2625 | |
| 87 | 79 | 553.25 | 552.0276 | 553.2625 | |
| 88 | 80 | 559.25 | 558.0279 | 559.2625 | |
| 89 | 81 | 565.25 | 564.0282 | 565.2625 | |
| 90 | 82 | 571.25 | 570.0285 | 571.2625 | |
| 91 | 83 | 577.25 | 576.0288 | 577.2625 | |
| 92 | 84 | 583.25 | 582.0291 | 583.2625 | |

FIG. 1E (Prior Art)

| | | | | | |
|---|---|---|---|---|---|
| 93 | 85 | 589.25 | 588.0294 | 589.2625 | |
| 94 | 86 | 595.25 | 594.0297 | 595.2625 | |
| 95 | 87 | 601.25 | 600.03 | 601.2625 | |
| 96 | 88 | 607.25 | 606.0303 | 607.2625 | |
| 97 | 89 | 613.25 | 612.0306 | 613.2625 | |
| 98 | 90 | 619.25 | 618.0309 | 619.2625 | |
| 99 | 91 | 625.25 | 624.0312 | 625.2625 | |
| 100 | 92 | 631.25 | 630.0315 | 631.2625 | |
| 101 | 93 | 637.25 | 636.0318 | 637.2625 | |
| 102 | 94 | 643.25 | 642.0321 | 643.2625 | |
| 57 | 95 | 91.25 | 90.0045 | 91.2625 | A-5 |
| 58 | 96 | 97.25 | 96.0048 | 97.2625 | A-4 |
| 59 | 97 | 103.25 | 102.0051 | 103.2625 | A-3 |
| 60 | 98 | 109.2750* | 108.025 | 109.2750* | A-2 |
| 61 | 99 | 115.2750* | 114.025 | 115.2750* | A-1 |
| 103 | 100 | 649.25 | 648.0324 | 649.2625 | |
| 104 | 101 | 655.25 | 654.0327 | 655.2625 | |
| 105 | 102 | 661.25 | 660.033 | 661.2625 | |

FIG. 1F (Prior Art)

| 108 | 105 | 679.25 | 678.0339 | 679.2625 | |
|---|---|---|---|---|---|
| 109 | 106 | 685.25 | 684.0342 | 685.2625 | |
| 110 | 107 | 691.25 | 690.0345 | 691.2625 | |
| 111 | 108 | 697.25 | 696.0348 | 697.2625 | |
| 112 | 109 | 703.25 | 702.0351 | 703.2625 | |
| 113 | 110 | 709.25 | 708.0354 | 709.2625 | |
| 114 | 111 | 715.25 | 714.0357 | 715.2625 | |
| 115 | 112 | 721.25 | 720.036 | 721.2625 | |
| 116 | 113 | 727.25 | 726.0366 | 727.2625 | |
| 117 | 114 | 733.25 | 732.0366 | 733.2625 | |
| 118 | 115 | 739.25 | 738.0369 | 739.2625 | |
| 119 | 116 | 745.25 | 744.0372 | 745.2625 | |
| 120 | 117 | 751.25 | 750.0375 | 751.2625 | |

METHOD AND SYSTEM FOR SCANNING VIDEO CARRIER CHANNELS OF A TELEVISION

BACKGROUND OF THE INVENTION

1. Field of the Invention

The invention relates to a technical field of television (TV) channels and, more particularly, to a method and system for scanning video carrier channels of a TV.

2. Description of Related Art

The input signals of a RF input terminal on typical TVs can be grouped into a wireless TV signal and a wired TV signal. For US cable televisions (CATVs), the video carrier channels can be grouped into three types, standard cable (STD)/incremental coherent carrier (HRC)/harmonically related carrier (IRC). FIGS. 1A-1G is a schematic table of CATV video carrier channels. A typical CATV records the predetermined channel frequencies in a form of table and stores the table in an internal memory.

Figure 2:
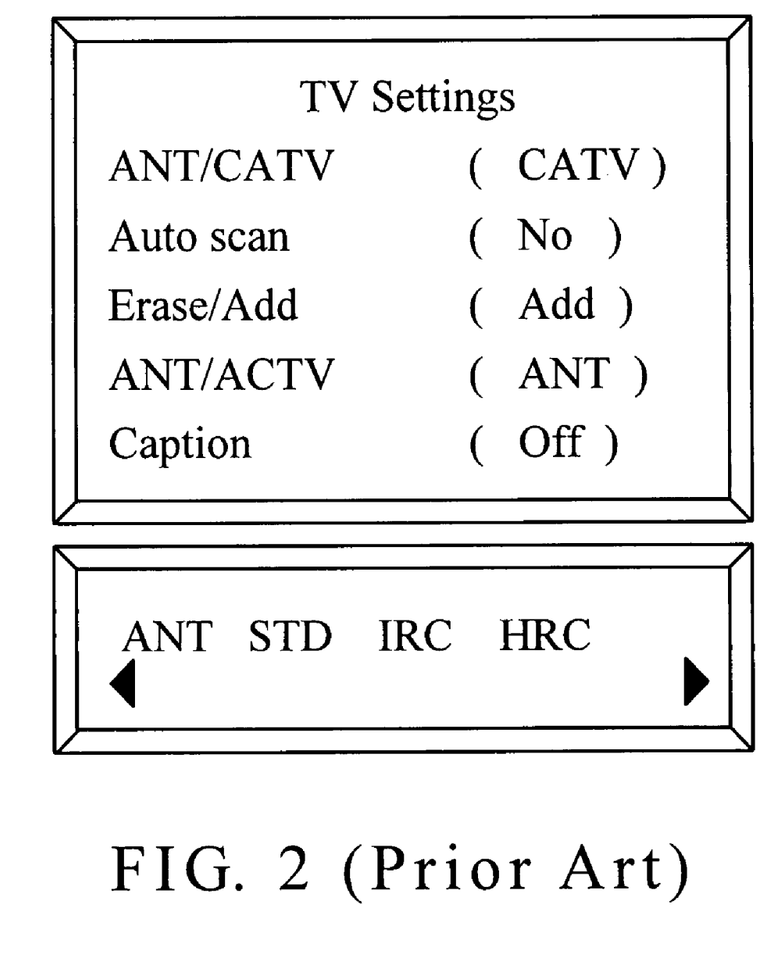
FIG. 2 is an on-screen display (OSD) menu of a TV.

Accordingly, when a user watches a CATV program, the user requires turning the setting function from "TV/CABLE" into "CABLE" or "CATV". Due to a variety of brands, some CATV buttons may be implemented on a remote controller, or some CATV options may be included in an on-screen display (OSD) menu. FIG. 2 is an on-screen display (OSD) menu of a TV. As shown in FIG. 2, when a user presses the "CABLE" button, the OSD frame presents an "HRC/IRC/STD" submenu to ask the user to select the options to thereby position an appropriate video carrier. However, most users do not understand which CATV, HRC, IRC or STD, is used, and accordingly cannot select an appropriate CATV so that the image cannot be displayed on a TV screen accurately. Hence, it is required that an improved method and system for scanning video carrier channels of a TV.

SUMMARY OF THE INVENTION

An object of the invention is to provide a method and system for scanning video carrier channels of a TV, which simplifies the operation of a TV menu so that a user can watch the CATV programs by only selecting the option "CATV" without regarding STD, IRC or HRC.

Another object of the invention is to provide a method and system for scanning video carrier channels of a TV, which performs the functions of full-channel memory and channel auto-scan to thereby ensure that all preset CATV programs can have a proper video carrier channel configuration (STD/HRC/IRC).

A further object of the invention is to provide a method and system for scanning video carrier channels of a TV, which automatically scans a single channel to thereby ensure that the channel programs can be accurately obtained when a user selects a new channel every time.

In accordance with one aspect of the present invention, there is provided a method for scanning a single video carrier channel of a television. The television (TV) includes a memory storing a plurality of central frequencies of channels. The method includes the steps of: (A) entering a channel; (B) providing a frequency correction, which is set to zero in initialization; (C) reading a central frequency of the channel from the memory as a target frequency of the channel; (D) determining if a TV channel exists at the target frequency; if the TV channel exists, recording the target frequency as a frequency of the channel, and otherwise executing step (E); (E) adding a predetermined frequency difference to the frequency correction to thereby obtain an updated frequency correction; (F) when the updated frequency correction is not greater than a predetermined frequency bound, setting the target frequency to a value of the central frequency plus or minus the updated frequency correction and executing step (D).

In accordance with another aspect of the present invention, there is provided a method for scanning all video carrier channels of a television. The television (TV) includes a memory storing a plurality of central frequencies of channels. The method includes the steps of: (A) reading a central frequency of a channel from the memory as a target frequency of the channel; (B) providing a frequency correction, which is set to zero in initialization; (C) determining if a TV channel exists at the target frequency; if the TV channel exists, recording the target frequency as a frequency of the channel and executing step (F), and otherwise executing step (D); (D) adding a predetermined frequency difference to the frequency correction to thereby obtain an updated frequency correction; (E) when the updated frequency correction is not greater than a predetermined frequency bound, setting the target frequency to a value of the central frequency plus or minus the updated frequency correction and executing step (C), and otherwise recording the channel as a non-existing channel; (F) determining if the full channels are scanned completely; if not, reading a central frequency of a next channel from the memory as a target frequency of the next channel and executing step (B) until the full channels are scanned completely.

In accordance with a further aspect of the present invention, there is provided a tuner control system, which controls one tuner to scan all channels. The system includes a tuner, a first memory and a controller. The tuner has a frequency register and an indicative register. When a frequency is written in the frequency register, the indicative register indicates whether a TV channel exists at the frequency written in the frequency register. The first memory stores a plurality of central frequencies of channels. The controller is connected to the tuner through an I2C bus and the first memory through an internal bus in order to perform an initialization and operation setting on the tuner. When a channel scan is performed, the controller reads a central frequency of a channel from the first memory and writes the central frequency of the channel in the frequency register. Next, the controller reads a value of the indicative register, and accordingly corrects the frequency within a predetermined frequency bound range by adding or subtracting the central frequency by a frequency correction, which is gradually increased when the TV channel does not exist at the frequency, until the frequency corresponding to a channel is obtained.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
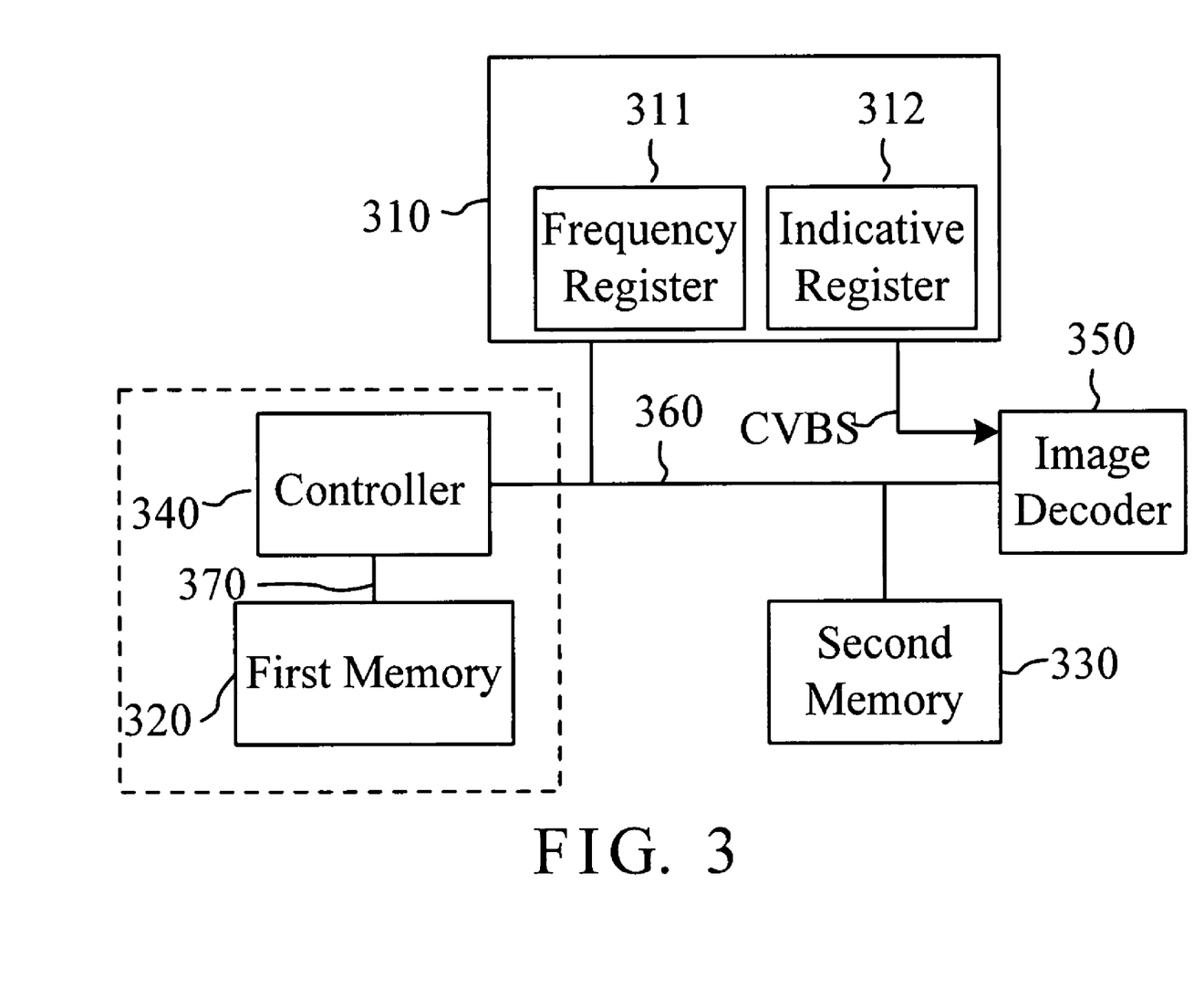
FIG. 3 is a block diagram of a tuner control system in accordance with the invention.

FIG. 3 is a block diagram of a tuner control system in accordance with the invention, which controls a tuner to scan the channels. The system includes a tuner 310, a first memory 320, a second memory 330, a controller 340 and an image decoder 350.

The tuner 310 is connected to the controller 340 through an I2C bus 360. The tuner 310 has a frequency register 311 and an indicative register 312. When a frequency is written in the frequency register 311, the tuner 310 detects if there is a TV channel existing at the frequency. The indicative register 312 can indicate whether a TV channel exists at the frequency written in the frequency register. When the TV channel exists at the frequency written in the frequency register, the tuner 310 outputs a signal of the TV channel, i.e. a CVBS signal.

The image decoder 350 is connected to the tuner 310 in order to receive and decode the CVBS signal output by the tuner 310 to thereby obtain an image signal for display.

The first memory 320 is connected to the controller 340 through an internal bus 370. The first memory 320 stores a plurality of central frequencies of channels respectively corresponding to a plurality of STD television channel frequencies in a one-to-one manner. The first memory 320 preferably is a read-only memory (ROM). The first memory 320 can be included in the controller 340.

The controller 340 is connected to the tuner 310, the second memory 330 and the image decoder 350 through the I2C bus 360, and performs an initialization and operation setting on the tuner 310 and the image decoder 350. In addition, the second memory 330 is initialized as same as the first memory 320. Accordingly, the second memory 330 also stores the plurality of central frequencies of channels respectively corresponding to the plurality of STD signals. However, in other embodiments, the second memory 330 can store a plurality of differences, which are corresponded to the plurality of central frequencies of channels in a one-to-one manner.

When a channel scan is performed, the controller 340 reads a central frequency of a channel from the first memory 320 as a target frequency of the channel. The controller 340 writes the target frequency into the frequency register 311 through the I2C bus 360, so that the tuner 310 can detect if there is a TV channel existing at the target frequency.

The controller 340 reads the content of the indicative register 312 through the I2C bus 360, and accordingly determines if the TV channel exists at the target frequency. When the TV channel exists at the target frequency, the controller 340 records the target frequency as a frequency of the channel and writes it into the second memory 330. Otherwise, the controller 340 adds or subtracts the target frequency by a predetermined frequency difference to thereby obtain a corrected target frequency. The predetermined frequency difference preferably is 62.5 KHz.

When the controller 340 determines that the corrected target frequency is greater than a first frequency and smaller than a second frequency, it writes the corrected target frequency in the frequency register 311 through the I2C bus 360, so that the tuner can further detect if there is a TV channel existing at the corrected target frequency. The first frequency is obtained by subtracting a predetermined frequency bound from the central frequency of the channel while the second frequency is obtained by adding the predetermined frequency bound to the central frequency of the channel. The predetermined frequency bound preferably is 2 MHz. When the controller 340 determines that the corrected target frequency is smaller than the first frequency and greater than the second frequency, it records that there is no channel existing at the target frequency, i.e., the frequency of the channel is of a non-existing channel.

The indicative register 312 stores an automatic frequency control (AFC) value for the tuner 310. When the AFC value of the indicative register 312 does not locate in a predetermined frequency-locked range, it indicates that there is no channel existing at the frequency written in the frequency register 311. When the AFC value is an optimal predetermined frequency-locked value, it indicates that an optimal TV channel for watch exists at the frequency written in the frequency register 311 and the frequency of the optimal TV channel equals to the frequency written in the frequency register 311.

The controller 340 can read the AFC value of the indicative register 312, and accordingly determine if there is a TV channel around the frequency written in the frequency register 311. The controller 340 further determines if the frequency written in the frequency register 311 is smaller or greater than the frequency of the TV channel, and accordingly determines to add or subtract the target frequency by the frequency difference (62.5 KHz) to thereby produce the corrected target frequency.

Figure 4:
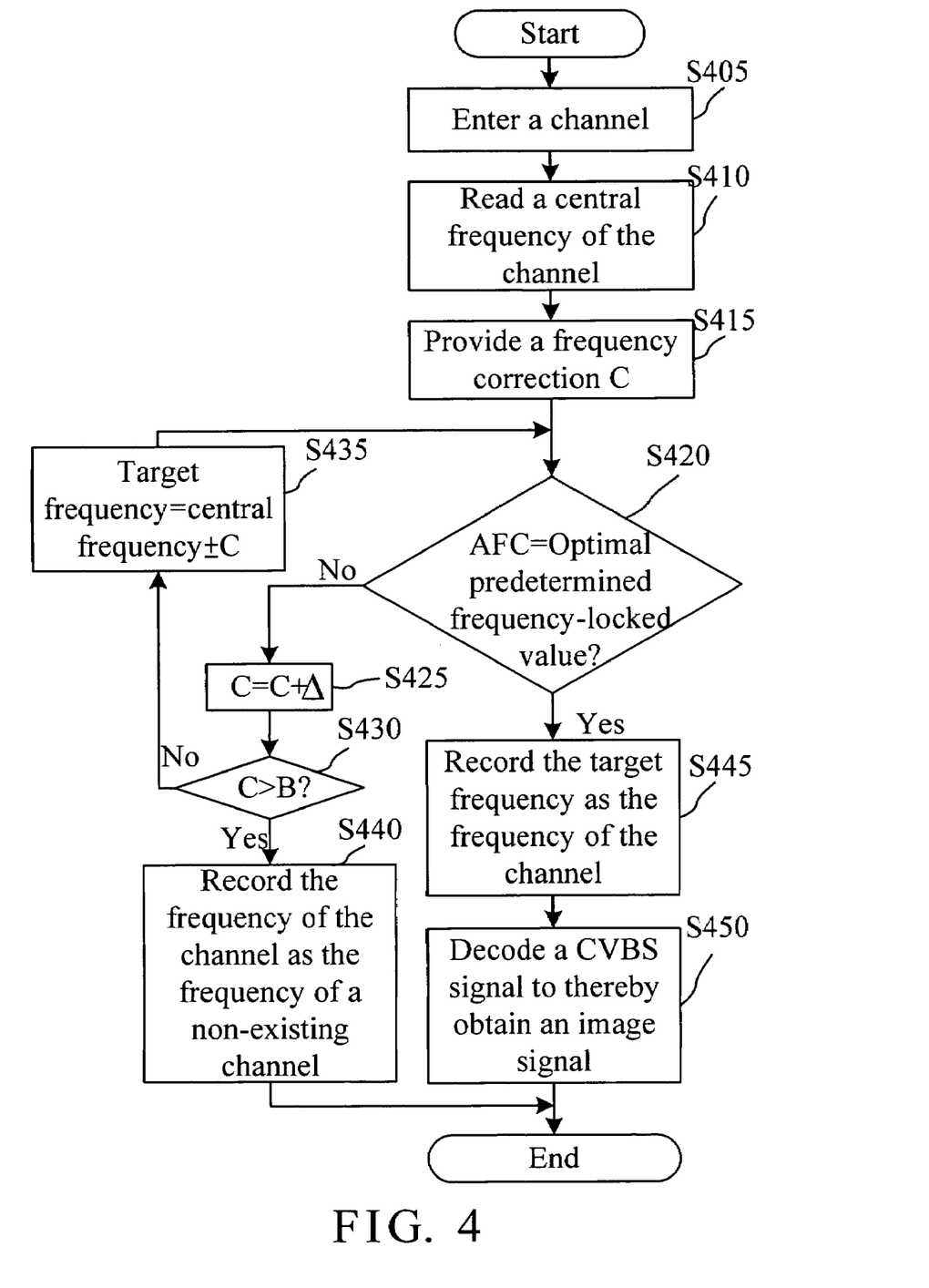
FIG. 4 is a flowchart of a method for scanning a single video carrier channel of a TV in accordance with the invention.

FIG. 4 is a flowchart of a method for scanning a single video carrier channel of a TV in accordance with the invention. As shown in FIG. 4, the TV includes the first memory 320 to store the plurality of central frequencies Fc of channels corresponding to the plurality of STD signals. As shown in FIG. 4, in step S405, a channel is entered by, for example, the digit keys of a remote controller (not shown). In step S410, the controller 340 reads a central frequency Fc of the channel from the first memory 320 as a target frequency Ft of the channel. In step S415, a frequency correction C is provided, which is set to zero in initialization. The controller 340 writes the target frequency Ft to the frequency register 311 through the I2C bus 360, so that the tuner 310 can detect if there is a TV channel existing at the target frequency Ft.

Step S420 determines if there is an optimal TV channel for watch at the target frequency Ft. If the optimal TV channel for watch exists at the target frequency Ft, the target frequency Ft is recorded as the frequency of the channel (step S445), and otherwise step S425 is executed. Step S420 is executed by using the controller 340 to read the content of the indicative register 312 through the I2C bus 360. When the AFC value contained in the indicative register 312 is an optimal predetermined frequency-locked value, the frequency written in the frequency register 311 is determined as the frequency of the TV channel which is the optimal TV channel for watch.

Step S425 updates the frequency correction C by adding a predetermined frequency difference $\Delta$, i.e., $C=C+\Delta$. The predetermined frequency difference $\Delta$ is a correction for frequency compensation, and preferably 62.5 KHz. Step S430 determines if the frequency correction C is greater than a predetermined frequency bound B. If the updated frequency correction C is not greater than the predetermined frequency bound B, the target frequency Ft is corrected as a value of the central frequency Fc plus or minus the updated frequency correction C (step S435), and step S420 is executed. The predetermined frequency bound B is between two adjacent channels before and after the target channel, and preferably 2 MHz.

In step S440, when the updated frequency correction C is greater than the predetermined frequency bound B, it indicates that the frequency of the video carrier channel is scanned over the predetermined range, and accordingly the frequency of the channel is recorded as the frequency of a non-existing channel.

In step S445, it determines that the frequency of the video carrier channel is found, i.e., the frequency of the channel is the frequency written in the frequency register 311. Thus, the frequency of the video carrier channel is recorded in the second memory 330. The tuner 310 outputs a CVBS signal corresponding to the TV channel in accordance with the frequency written in the frequency register 311. The image decoder 350 decodes the CVBS signal to thereby obtain an image signal for display (step S450).

Figure 1A:
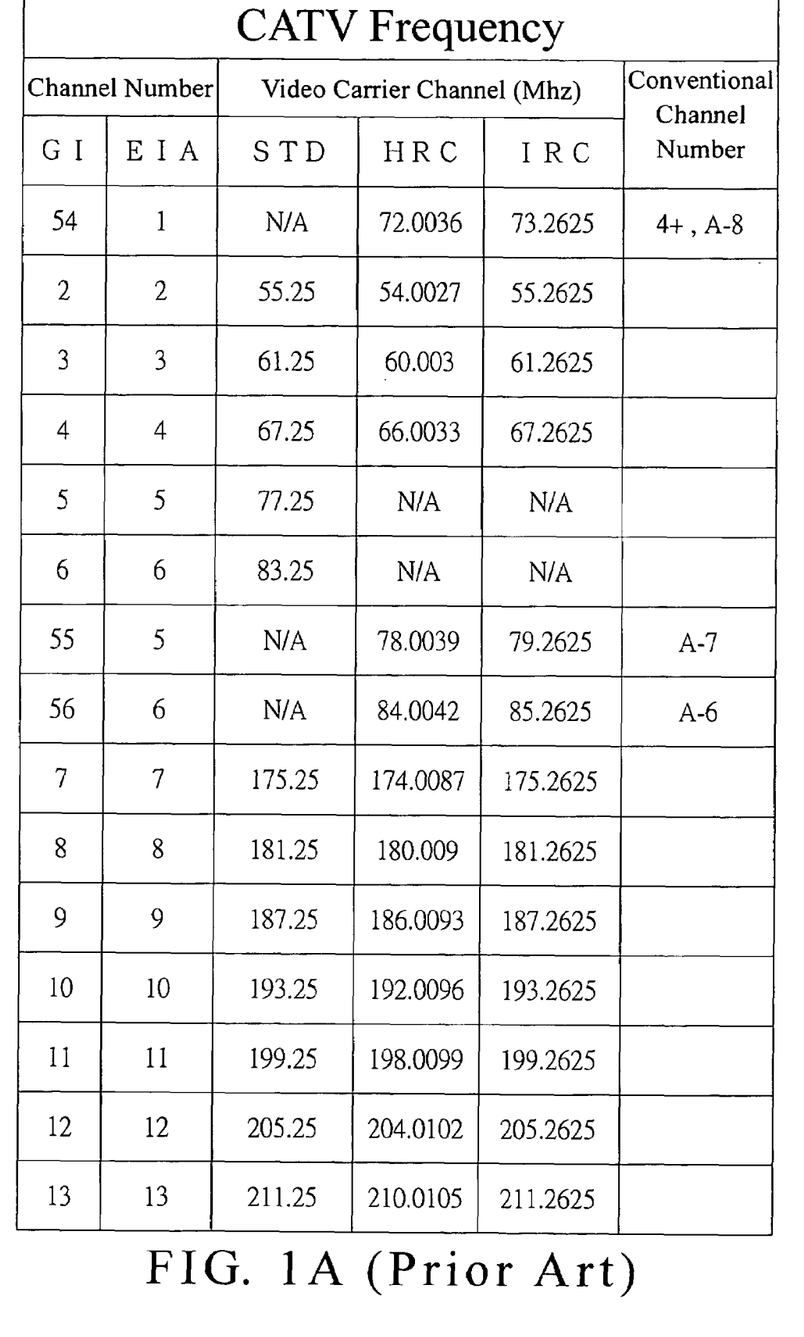
FIGS. 1A-1G are a schematic table of CATV video carrier channels.
Figure 1B:
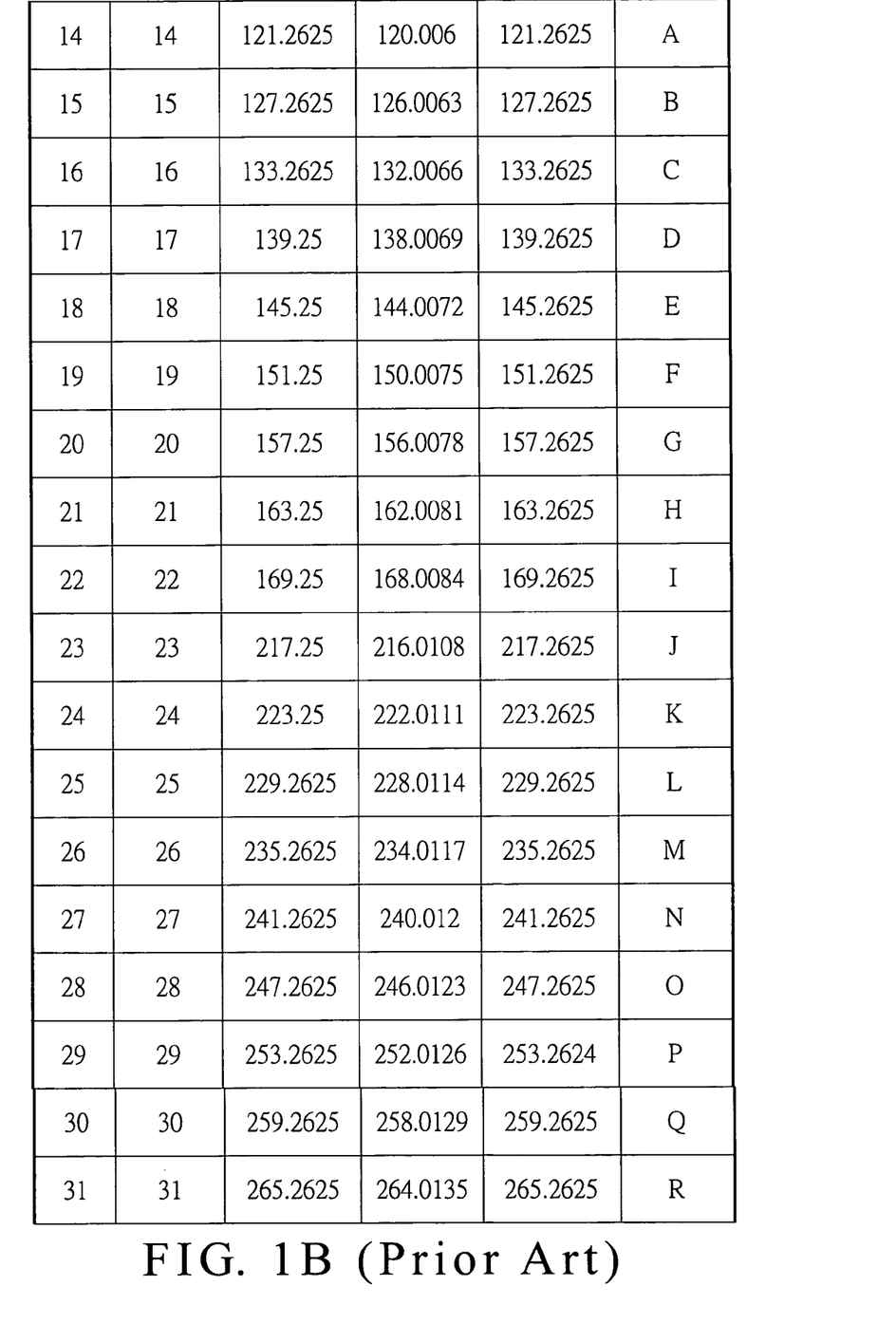
Figure 1C:
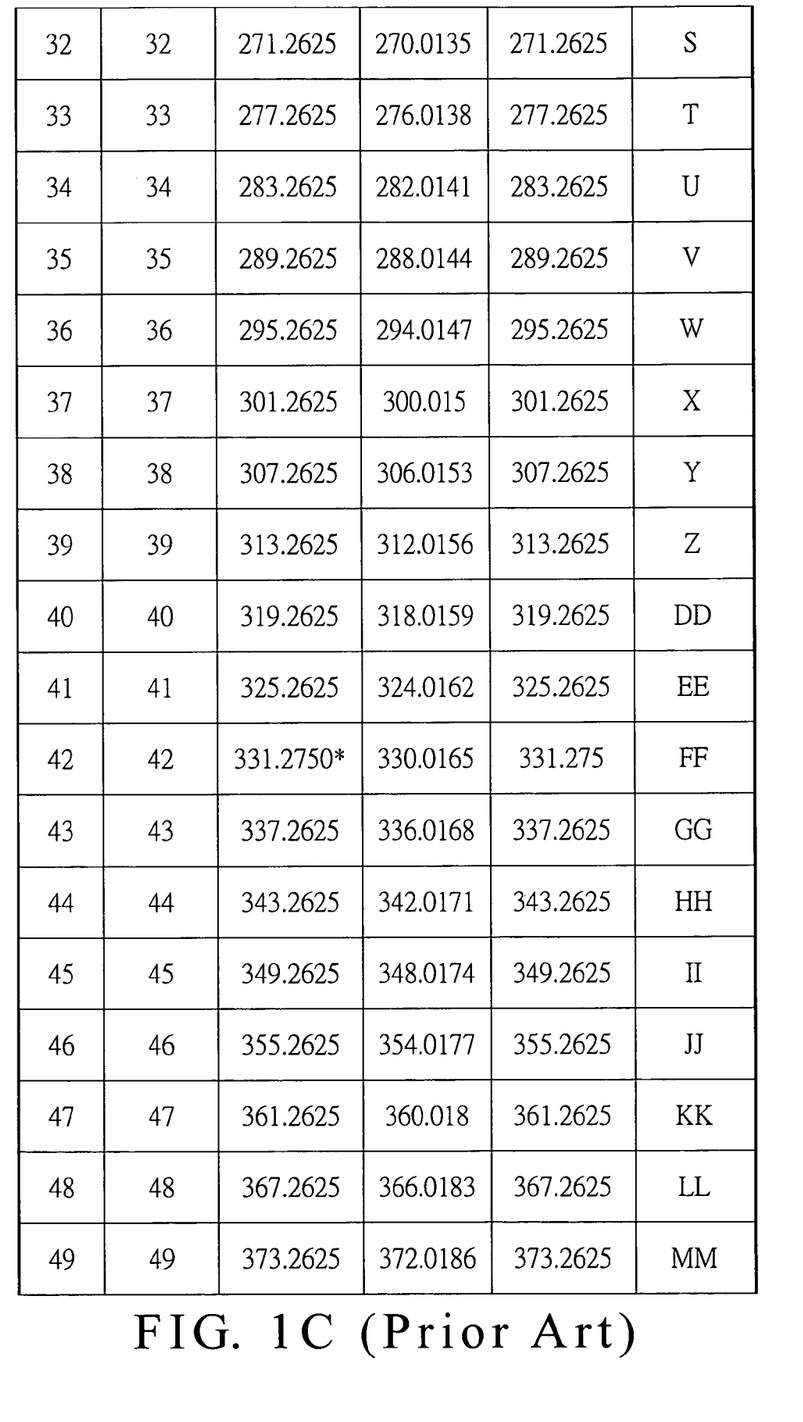
Figure 1D:
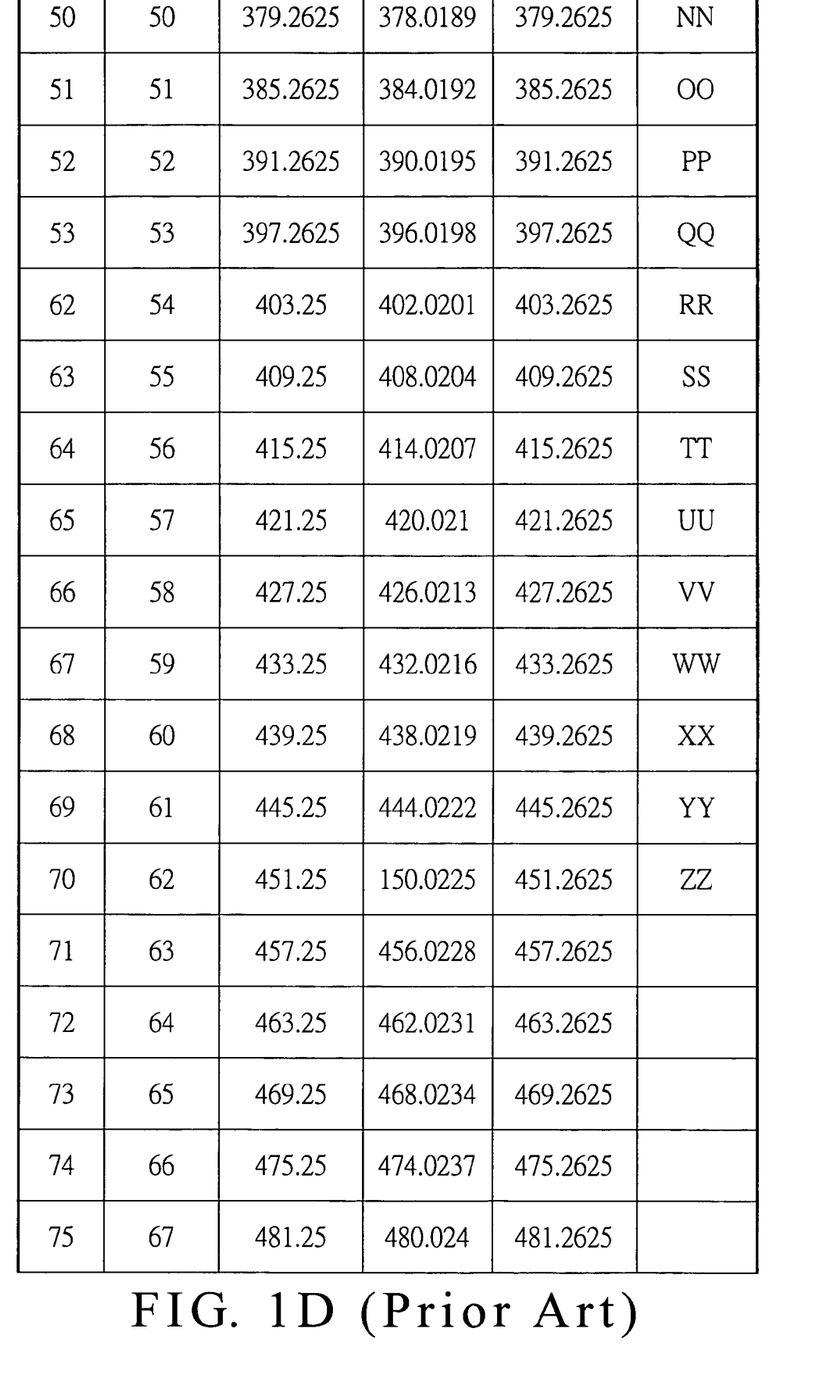
Figure 1E:
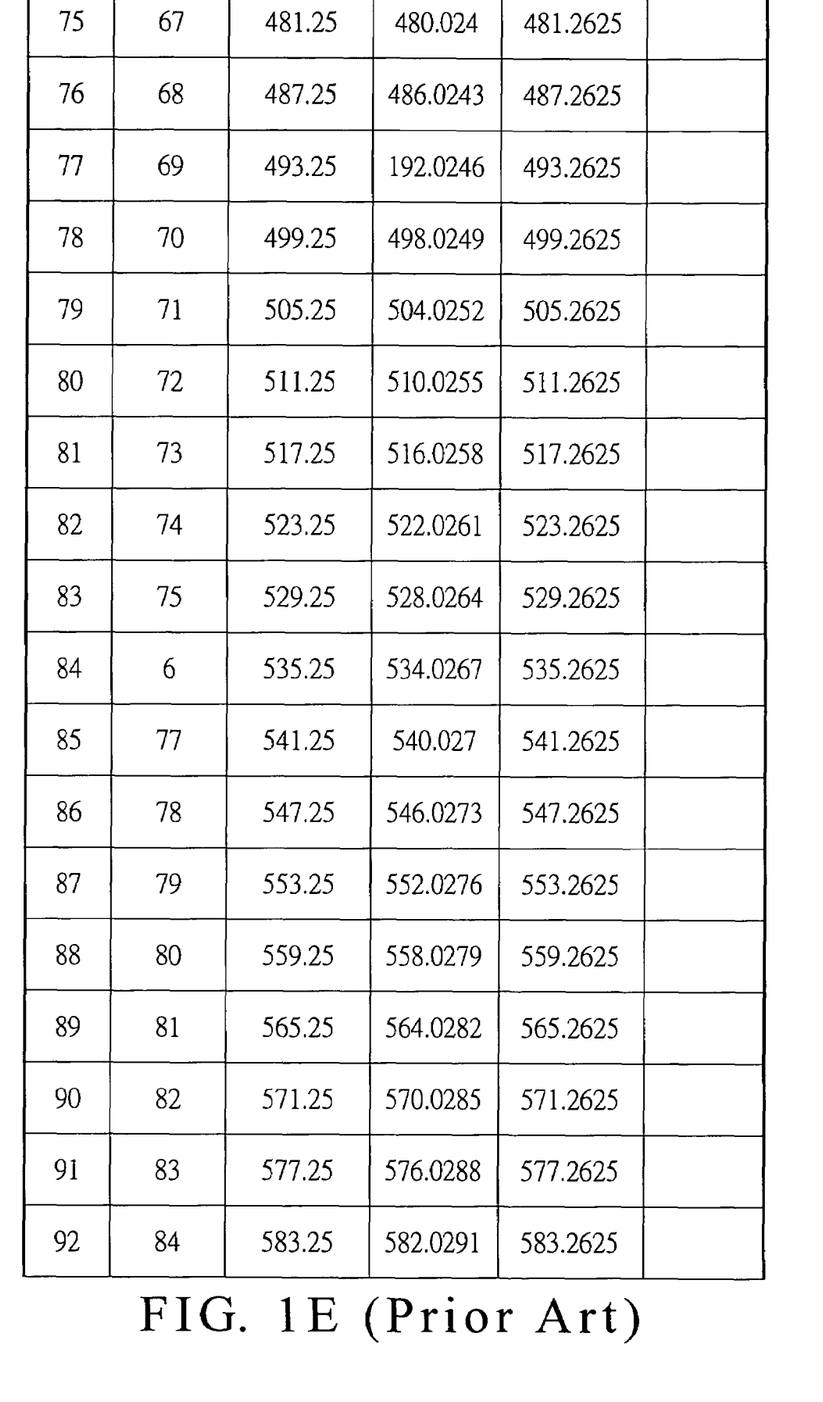
Figure 1F:
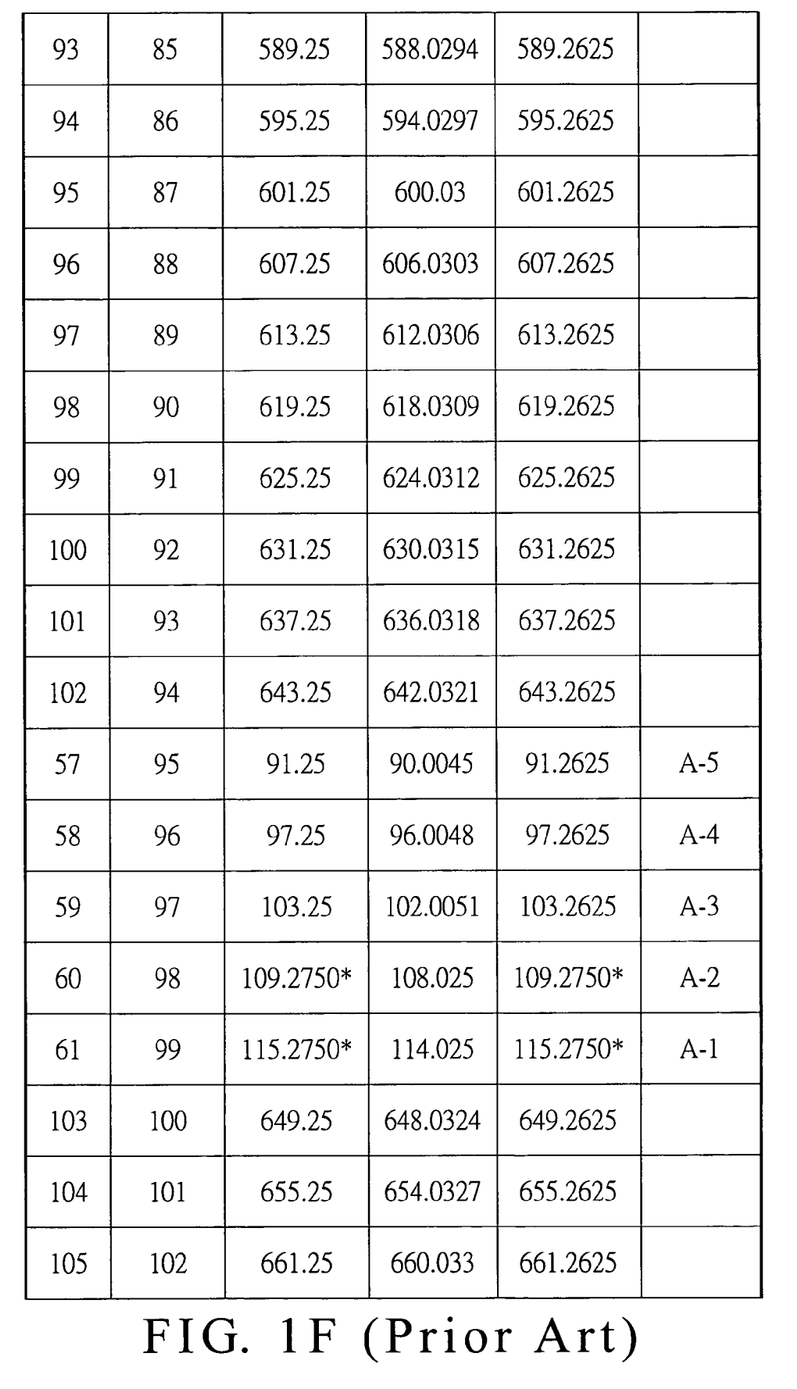
Figure 1G:
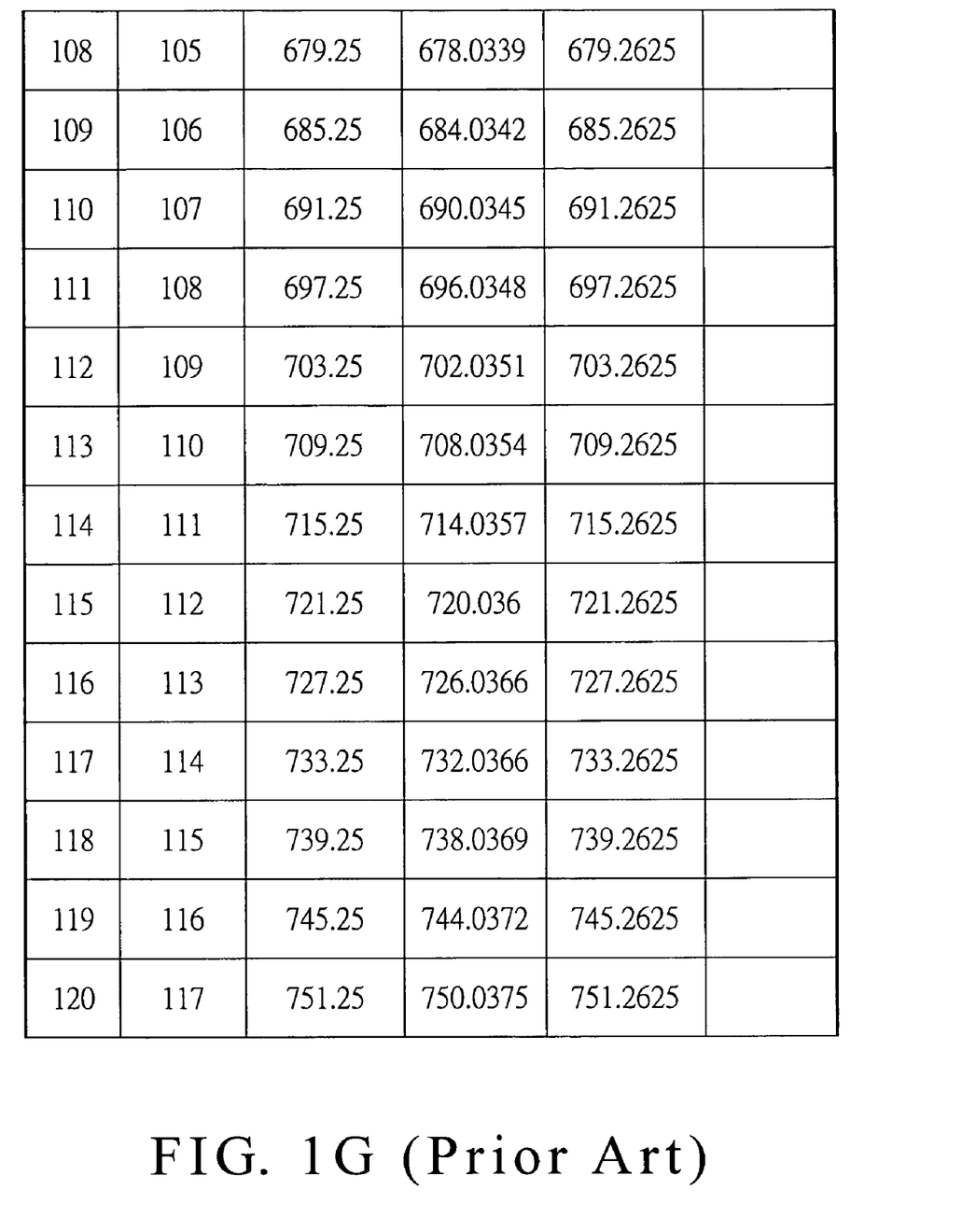
Figure 5:
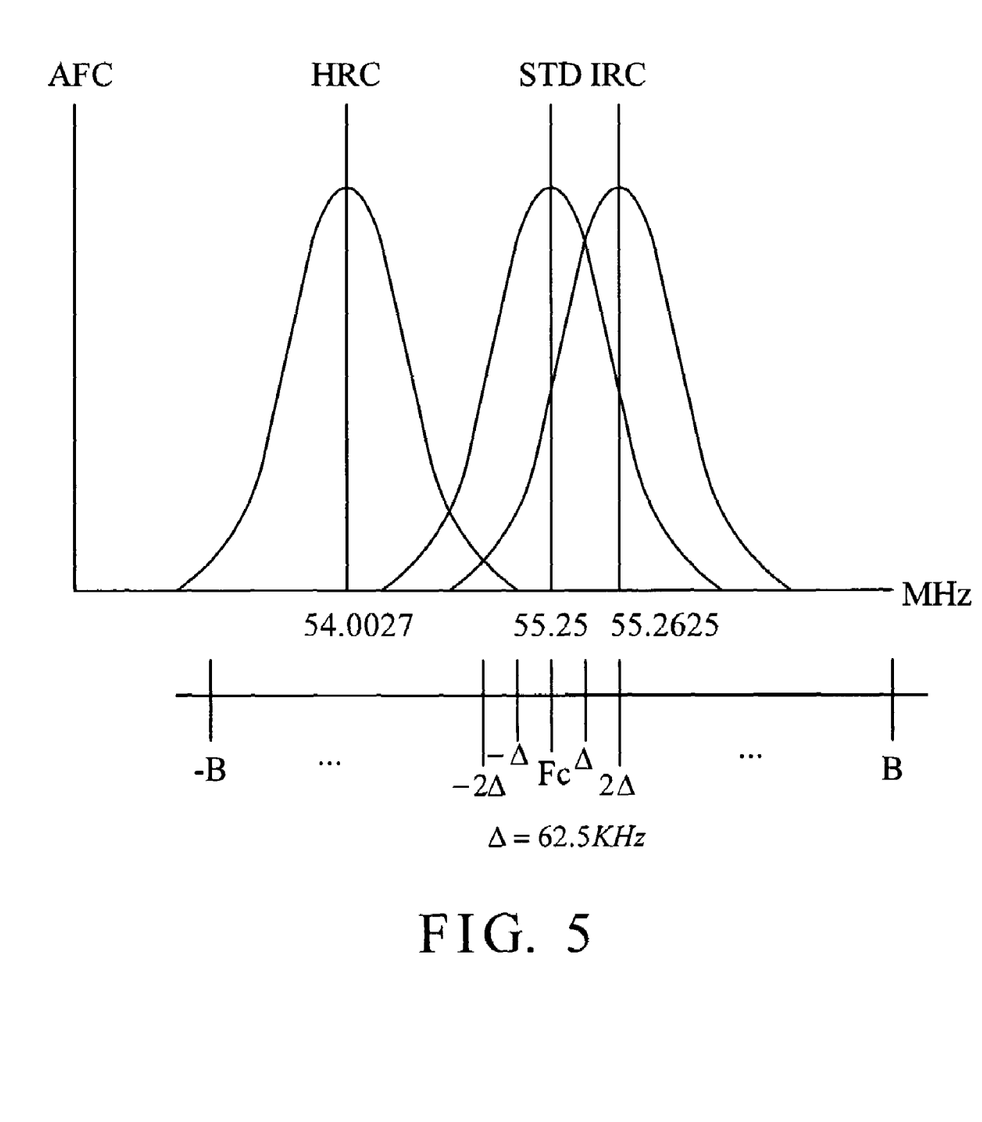
FIG. 5 is a schematic graph of a scanning range for a single video carrier channel in accordance with the invention.

FIG. 5 is a schematic graph of a scanning range for a single video carrier channel in accordance with the invention, which is described by an example having the waveforms of three configurations (STD, IRC, HRC) of a CATV channel 2. Upon the CATV frequency table of FIG. 1, it is known that the central frequency of the STD channel is at 55.25 MHz, the central frequency of the HRC channel is at 54.0027 MHz, and the central frequency of the IRC channel is at 54.2625 MHz, which are distributed as shown in FIG. 5. Since the central frequency of the STD channel locates between the central frequencies (54.0027 MHz, 54.2625 MHz) of the HRC and IRC channels, the invention uses the central frequency of the STD channel as a central frequency in searching, i.e., Fc=55.25 MHz, and searches left and right 2 MHz (i.e., the predetermined frequency bound B=2 MHz) of the central frequency for a channel. The demodulation of the tuner 310 is applied to each step (the predetermined frequency difference Δ) by gradually increasing or decreasing 62.5 KHz until an optimal response is presented at a certain frequency.

Figure 6:
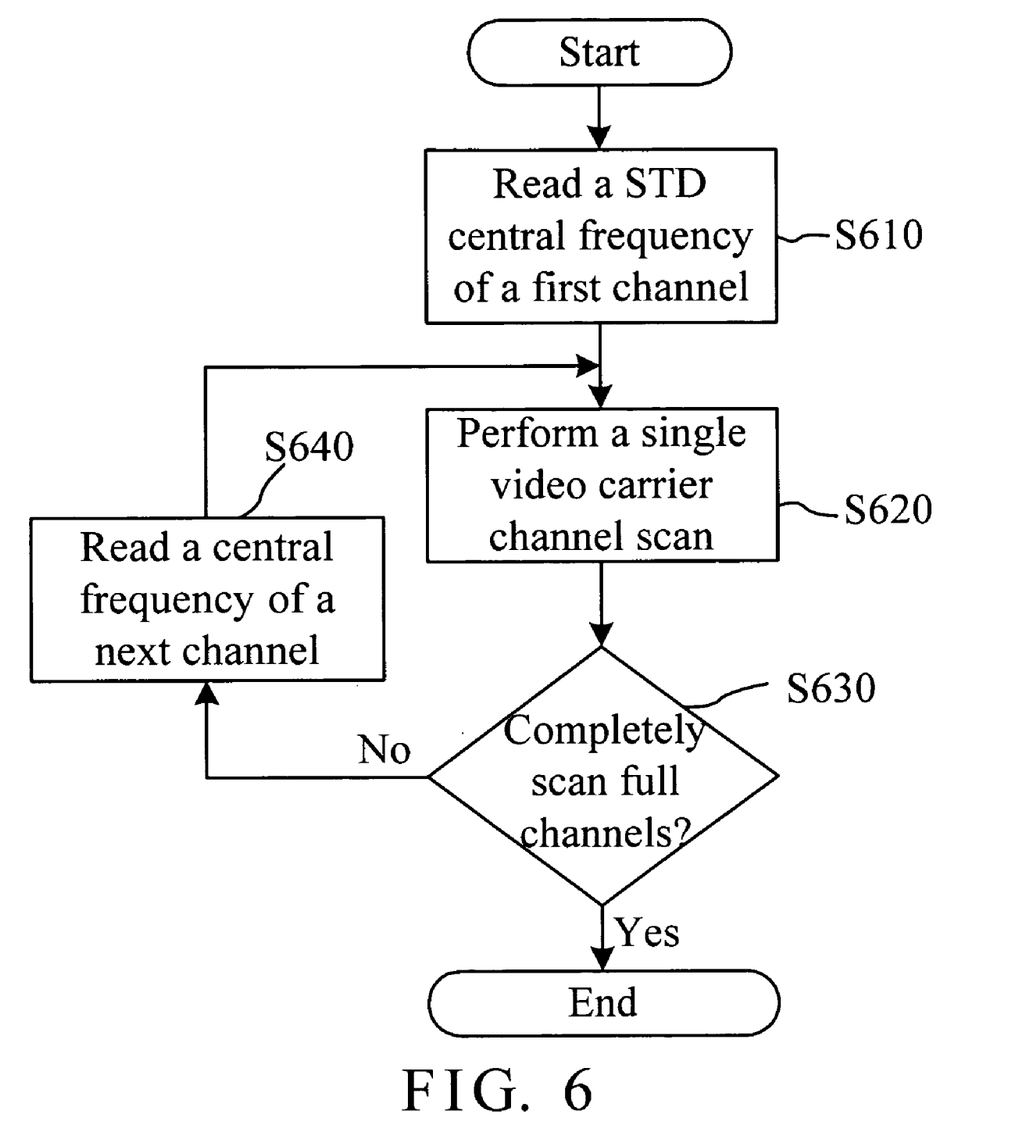
FIG. 6 is a flowchart of a method for scanning all video carrier channels of a TV in accordance with the invention.

FIG. 6 is a flowchart of a method for scanning all video carrier channels of a TV in accordance with the invention. In FIG. 6, the TV includes the first memory 320 storing the plurality of central frequencies Fc of channels corresponding to the plurality of STD signals. As shown in FIG. 6, step S610 reads a central frequency Fc of a first channel from the first memory 320 as a target frequency. The central frequency Fc of the first channel is of a STD signal.

Step S620 executes the method for scanning a single video carrier channel, which is shown in steps S405-S450 of FIG. 4, in order to find the optimal central frequency of the first channel for watch. Step S630 determines if the full channels are scanned completely. When the full channels are not scanned completely, a central frequency of a next channel from the memory 320 is read (step S640) and step S620 is executed to find the optimal central frequency of the next channel. When the full channels are scanned completely, the procedure is ended.

In view of the foregoing, it is known that the invention can provide a user who desires to view a CATV program with a simplified operation of just selecting "CATV". Thus, the user has no worry to select STD, IRC or HRC. In addition, the invention can provide the functions of full-channel memory and channel auto-scan to ensure that all preset CATV programs can have a proper video carrier channel configuration (STD/HRC/IRC). Further, the invention can perform a single channel auto-scan to ensure that the appropriate channel programs are automatically searched when the user selects a new channel every time.

Although the present invention has been explained in relation to its preferred embodiment, it is to be understood that many other possible modifications and variations can be made without departing from the spirit and scope of the invention as hereinafter claimed.

What is claimed is:

1. A method for scanning a single video carrier channel of a television, the television (TV) including a memory storing a plurality of central frequencies of channels, the method comprising the steps of:

(A) entering a channel;
(B) providing a frequency correction, which is set to zero in initialization;
(C) reading a central frequency of the channel from the memory as a target frequency of the channel;
(D) determining if a TV channel exists at the target frequency; if the TV channel exists, recording the target frequency as a frequency of the channel, and otherwise executing step (E);
(E) adding a predetermined frequency difference to the frequency correction to thereby obtain an updated frequency correction; and
(F) when the updated frequency correction is not greater than a predetermined frequency bound, setting the target frequency to a value of the central frequency plus or minus the updated frequency correction and executing step (D).

2. The method as claimed in claim 1, wherein the frequency of the channel in step (D) is recorded in a frequency register for decoding, thereby outputting a TV signal.

3. The method as claimed in claim 1, wherein the channel is recorded as a non-existing channel when the updated frequency correction in step (F) is greater than the predetermined frequency bound.

4. The method as claimed in claim 1, wherein the plurality of central frequencies of channels stored in the memory corresponds to a plurality of STD signals in a one-to-one manner.

5. The method as claimed in claim 1, wherein the predetermined frequency bound in step (F) is between two adjacent channels before and after the target channel.

6. The method as claimed in claim 1, wherein the predetermined frequency difference in step (E) is a correction for frequency compensation.

7. The method as claimed in claim 1, wherein step (D) uses an automatic frequency control (AFC) value of a tuner to determine if the TV channel exists at the target frequency.

8. The method as claimed in claim 7, wherein no TV channel exists at the target frequency when the AFC value is out of a predetermined frequency-locked range.

9. The method as claimed in claim 7, wherein an optimal TV channel exists at the target frequency when the AFC value is an optimal predetermined frequency-locked value.

10. A method for scanning all video carrier channels of a television, the television (TV) including a memory storing a plurality of central frequencies of channels, the method comprising the steps of:

(A) reading a central frequency of a channel from the memory as a target frequency of the channel;
(B) providing a frequency correction, which is set to zero in initialization;
(C) determining if a TV channel exists at the target frequency; if the TV channel exists, recording the target frequency as a frequency of the channel and executing step (F), and otherwise executing step (D);
(D) adding a predetermined frequency difference to the frequency correction to thereby obtain an updated frequency correction;
(E) when the updated frequency correction is not greater than a predetermined frequency bound, setting the target frequency to a value of the central frequency plus or minus the updated frequency correction and executing step (C), and otherwise recording the channel as a non-existing channel; and
(F) determining if the full channels are scanned completely; if not, reading a central frequency of a next channel from the memory as a target frequency of the next channel and executing step (B) until the full channels are scanned completely.

11. The method as claimed in claim 10, wherein the frequency of the channel in step (C) is recorded in a frequency register for decoding, thereby outputting a TV signal.

12. The method as claimed in claim 10, wherein the plurality of central frequencies of channels stored in the memory corresponds to a plurality of STD television channel frequencies in a one-to-one manner.

13. The method as claimed in claim 10, wherein the predetermined frequency bound in step (E) is between two adjacent channels before and after the target channel.

14. The method as claimed in claim 10, wherein the predetermined frequency difference in step (D) is a correction for frequency compensation.

15. The method as claimed in claim 10, wherein step (C) uses an automatic frequency control (AFC) value of a tuner to determine if the TV channel exists at the target frequency.

16. The method as claimed in claim 15, wherein no TV channel exists at the target frequency when the AFC value is out of a predetermined frequency-locked range.

17. The method as claimed in claim 15, wherein an optimal TV channel exists at the target frequency when the AFC value is an optimal predetermined frequency-locked value.

18. A tuner control system, which controls one tuner to scan all channels, the system comprising:
    a tuner, which has a frequency register and an indicative register such that, when a frequency is written in the frequency register, the indicative register indicates whether a TV channel exists at the frequency written in the frequency register;
    a first memory, which stores a plurality of central frequencies of channels; and
    a controller, which is connected to the tuner through an I2C bus and to the first memory through an internal bus in order to perform an initialization and operation setting on the tuner;
    wherein the controller reads a central frequency of a channel from the first memory and writes the central frequency of the channel in the frequency register when a channel scan is performed, and is based on a value read from the indicative register to correct the frequency within a predetermined frequency bound range by adding or subtracting the central frequency by a frequency correction, which is gradually increased when the TV channel does not exist at the frequency, until the frequency corresponding to a channel is obtained.

19. The system as claimed in claim 18, further comprising:
    a second memory, which is connected to the controller through the I2C bus such that the controller records the frequency of the channel in the second memory when the frequency of the channel is found.

20. The system as claimed in claim 18, wherein the plurality of central frequencies of channels stored in the first memory corresponds to a plurality of STD television channel frequencies in a one-to-one manner.

21. The system as claimed in claim 18, wherein the predetermined frequency bound range is between two adjacent channels before and after the target channel.

22. The system as claimed in claim 18, wherein the predetermined frequency difference is a correction for frequency compensation.

23. The system as claimed in claim 18, wherein the indicative register stores an automatic frequency control (AFC) value of the tuner.

* * * * *